(No Model.) F. J. F. BRUGUIERE. 2 Sheets—Sheet 2.
ENGINE.
No. 599,381. Patented Feb. 22, 1898.
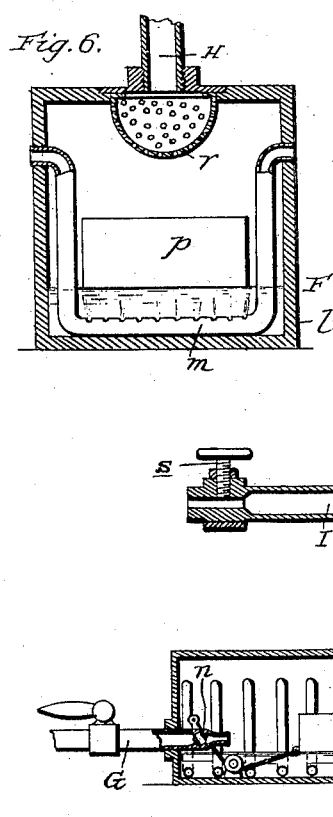
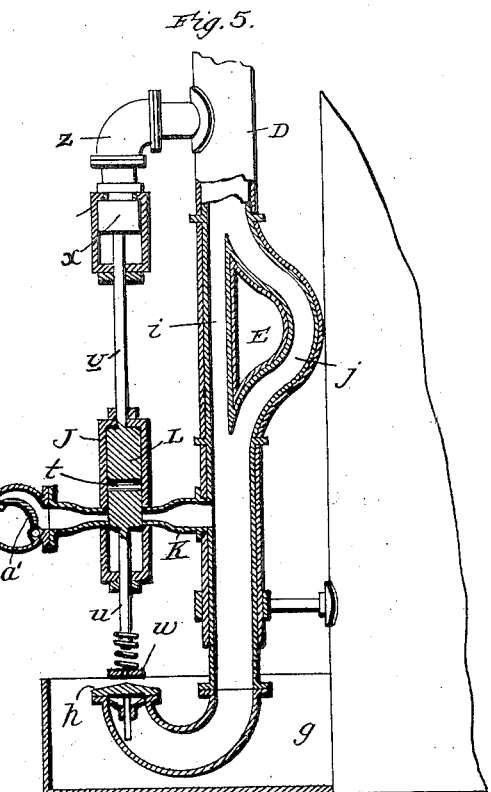
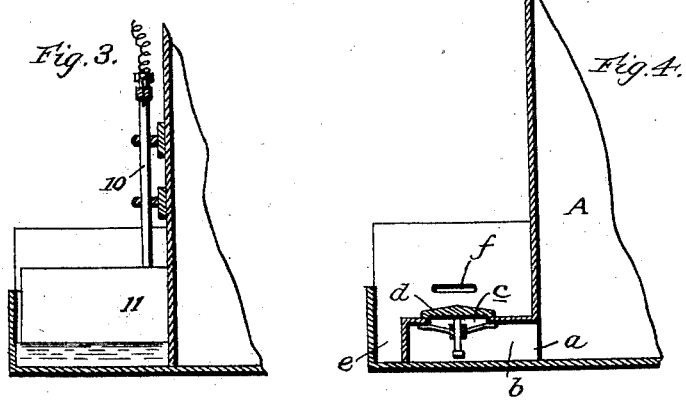
Witnesses:
Inventor
F. J. F. Bruguiere
By James J Sheehy
Attorney

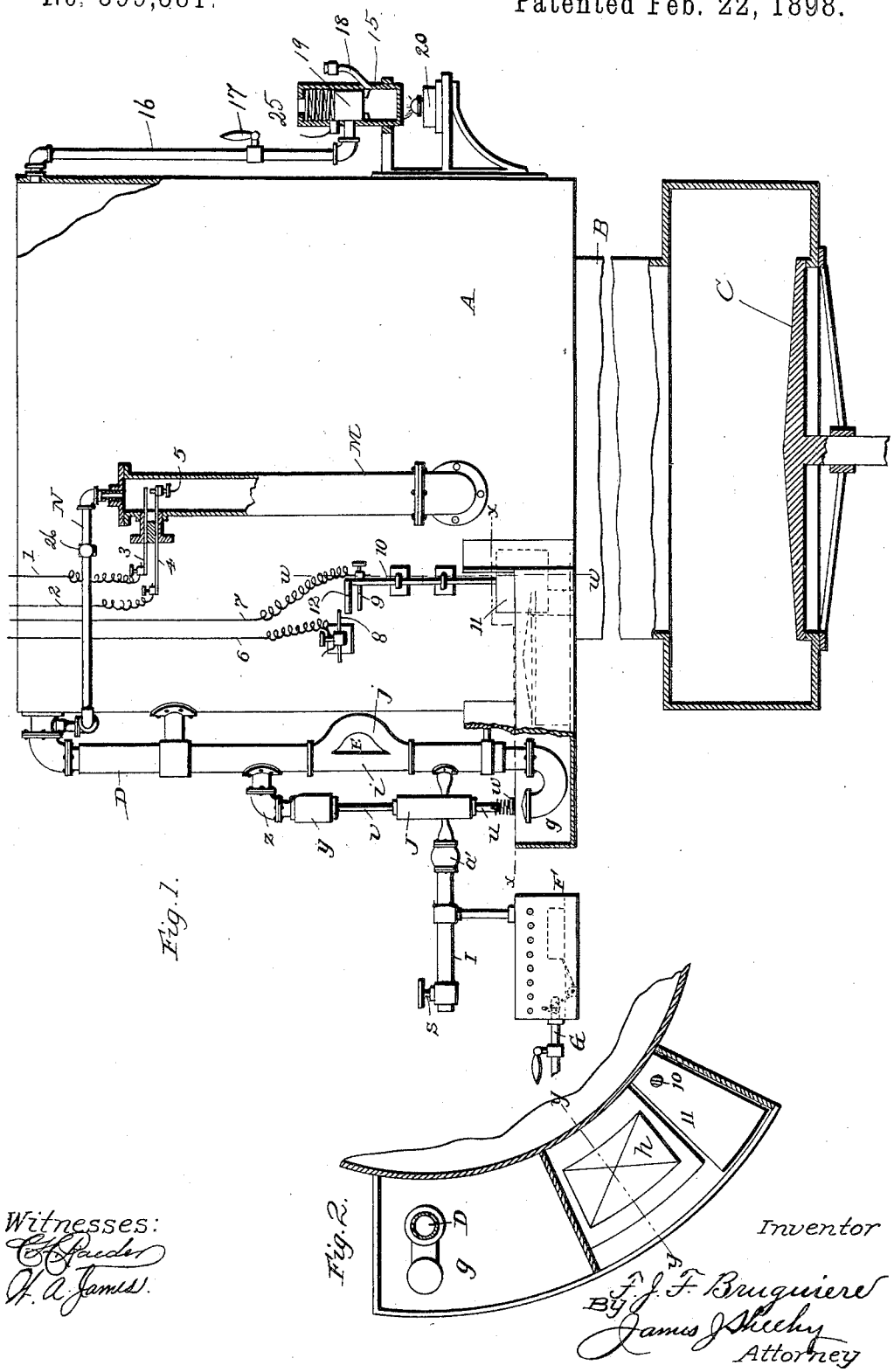

UNITED STATES PATENT OFFICE.

FREDERICK JOHN FRANCIS BRUGUIERE, OF NEW ORLEANS, LOUISIANA.

ENGINE.

SPECIFICATION forming part of Letters Patent No. 599,381, dated February 22, 1898.

Application filed January 18, 1897. Serial No. 619,632. (No model.)

*To all whom it may concern:*

Be it known that I, FREDERICK JOHN FRANCIS BRUGUIERE, a citizen of the United States, residing at New Orleans, in the parish of Orleans and State of Louisiana, have invented certain new and useful Improvements in Engines; and I do declare the following to be a full, clear, and exact description of the invention, such as will enable others skilled in the art to which it appertains to make and use the same.

My invention relates to an apparatus for producing a vacuum or partial vacuum in a closed chamber by the explosion or quick combustion of a volatilizable hydrocarbon therein and utilizing such vacuum to raise water or other liquid, and it will be fully understood from the following description and claims when taken in conjunction with the annexed drawings, in which—

Figure 1 is an elevation of my improved apparatus with parts in section. Fig. 2 is a detail section taken in the plane indicated by the line $x\ x$ of Fig. 1. Fig. 3 is a detail section taken in the plane indicated by the line $w\ w$ of Fig. 1. Fig. 4 is a detail section taken in the plane indicated by the line $y\ y$ of Fig. 2. Fig. 5 is an enlarged detail section illustrating the exhaust-pipe and parts connected therewith. Fig. 6 is an enlarged section taken in the plane indicated by the line $z\ z$ of Fig. 5.

In the said drawings similar letters and numerals designate corresponding parts in all of the several views, referring to which—

A indicates the vacuum-chamber of the apparatus.

B indicates a suction-pipe which communicates with the bottom of the vacuum-chamber and is connected with a source of water or other liquid supply, and C indicates a downwardly-seating check-valve, the said valve being adapted to rise to permit water to pass up into the chamber A when a vacuum is produced therein and being also adapted to seat, so as to prevent downward passage of the water from the said chamber.

The vacuum-chamber is provided adjacent to its bottom with the discharge-opening $a$, (see Fig. 4,) with which communicates a box $b$, having an opening $c$ in its top, controlled by a downwardly-seating check-valve which is adapted to permit water to pass up and out of box $b$ and prevent its return. The said box $b$ is contained in a receptacle $e$, which is of a greater depth than the box and is consequently enabled after each discharge of water from the chamber A to retain a sufficient quantity of water above the valve $d$ to form a water seal and thus effectually prevent the entry of air into the chamber A through opening $a$.

Communicating with the receptacle $e$ through an opening $f$ in one wall thereof is a receptacle $g$, in which is arranged the lower upturned end of the exhaust-pipe D, which communicates with the vacuum-chamber at a point adjacent to the upper end of the same, as shown in Fig. 1. Such upturned end of the pipe D is provided with a downwardly-seating check-valve $h$, and it is arranged in the receptacle $g$, as described, so that the water contained therein will seal it and prevent the entry of air into the chamber A through the pipe D.

The exhaust-pipe D is formed in two sections, between which is interposed a muffler E, (better shown in Fig. 5,) which has a conduit $i$ and a conduit $j$, communicating at their ends with each other and with the pipe-sections, as shown. In virtue of this it will be seen that the sound-waves when they reach the muffler E will divide and pass through the conduits $i\ j$ and will reunite below the muffler and by such reunion will act against each other and thus reduce the noise to a minimum, which is an important desideratum in this class of devices. The exhaust-pipe D is provided above the water-line of the receptacle $g$ with an insulating-covering $k$, and the muffler E is likewise provided, so as to prevent cooling of the same between the explosions, for a purpose presently described.

F indicates the carbureter of the apparatus, which preferably comprises the tank $l$ and the air-induction pipes $m$, which are connected at their ends to the side walls of the tank and extend across the bottom of the same and are provided in their transverse portions with minute apertures, as shown, for the entry of air into the gasolene or other hydrocarbon fuel which covers the bottom of the tank and the transverse portions of the pipes $m$.

The fuel is introduced into the tank through the pipe G, which is connected with a source of supply, (not illustrated,) and in order to maintain it at a certain desired height in the tank I provide the said pipe G with a cock $n$, with which is connected a float $p$, designed when the fuel reaches a certain height to close the cock and thus shut off the supply, and when the fuel falls a certain distance to open the cock and permit the fuel to flow into the tank.

H indicates a pipe which communicates with the interior of the carbureter F through a foraminated strainer $r$, and I indicates an air-induction pipe which communicates with the pipe H and is provided in advance of the same with a regulating-valve $s$ for controlling the admission of free air. The pipe I is connected with a valve-casing J, and said valve-casing is connected in turn by a pipe K with the exhaust-pipe D, the said pipe K resting in alinement with the pipe I, for a purpose presently to be described.

In the casing J is arranged a cut-off valve L, which has a port $t$ for effecting communication between the pipes I and K, and also has downwardly and upwardly extending stems $u$ $v$, the former being provided at its lower end with a spring-backed disk $w$ and the latter being provided at its upper end with a piston $x$, which is arranged in a cylinder $y$, connected with the pipe D by a pipe $z$, as shown. In virtue of this construction when the check-valve $h$ is forced upwardly by the force of the exhaust, which immediately follows an explosion in the chamber A, it exerts a pressure against the disk $w$ and raises the valve L and piston $x$ and through the medium of said valve L closes communication between pipes I K. By the explosion in the chamber A and the exhaust therefrom a vacuum is formed in said chamber which holds up the piston $x$ and at the same time causes the water to rise from the source of supply through pipe B and past valve C into the vacuum-chamber. The piston $x$ and valve L are held in their raised position until the water ceases to rise in the chamber C, when the weight of said piston and valve will be sufficient to overcome the suction remaining in said chamber A, and they will fall, the said valve L assuming a position that brings its port $t$ in alinement with the pipes I K. The water in the chamber A will now leave the same through the aperture $a$, box $b$, and valve-controlled aperture $c$, and air will be drawn through the pipe I by the suction thus created. Air will also be drawn through the carbureter F, in which it will be mixed with the hydrocarbon therein contained, and the vapor thus produced will be commingled at the juncture of pipes H and I with the free air entering through the valve-controlled end of pipe I. From the pipe I the fuel will be drawn past the check-valve $a'$, which is provided to prevent the particles of combustion from entering the carbureter, and through the port $t$ and valve L, the pipe K, and the pipe D into the chamber A. In passing through the pipe D, which is heated by the previous explosion, the gas will be heated, and will consequently enter the chamber A in an expanded condition.

M indicates the igniting-tube, which is connected at its lower end with the interior of the chamber A at about the elevation shown and has its upper end connected by a pipe $v$ with the pipe D, as better shown in Fig. 1, said pipe N being provided with valve 26 to prevent passage of explosive to tube M, but check its return. The water rises and recedes in this tube M in concert with that in the chamber A, and as it leaves said tube it creates a suction which draws a portion of the heated explosive mixture from the pipe D into the igniting-tube to be exploded by mechanism which will now be described.

1 and 2 indicate wires which form a part of the secondary circuit of an induction-coil, (not illustrated,) and 3 4 indicate conducting-rods electrically connected with the wires 2 and extending through suitable insulators into the igniting-tube M, the rod 4 being preferably provided within said tube with a screw 5, whereby the sparking arc may be regulated to suit a strong or weak battery.

6 7 are wires forming a part of the primary circuit of the induction-coil, the wire 6 being electrically connected to a spring 8, mounted on but insulated from the chamber A, while the wire 7 is connected with a conductive plate 9, carried by the rod 10 of a vertically-movable float 11. The rod 10 is also provided above the plate 9 with an insulating-plate 12, the object of which is to prevent the plate 9 from contacting with the spring 8 on the upward movement of the float 11 and yet not interfere with the plate 9 contacting for an instant with the spring 8 on the downward movement of the float and its rod.

The float 11 is arranged in the receptacle $e$, before described, and it is raised by the sudden rush of water which enters the receptacle when the chamber A is discharged and is held in its raised position until the discharge of water from chamber A ceases, when it will move downward and carry the plate 9 into contact with spring 8 and close the primary circuit of the induction-coil and thus form the spark between the rods 3 4 in the igniting-tube M. From this it will be observed that the explosion will take place after the water has left the chamber A and tube M and has drawn a charge of the explosive gas into the same. When the explosion takes place in the tube M, it will discharge the flame transversely through the lower portion of the chamber A, and will consequently ignite all the gas therein simultaneously, and the explosion acting upward will cause the particles of combustion to quickly leave the chamber through pipe M and thus accelerate the entry of water into the said chamber.

The operation described—that is to say, the automatic alternate filling of the chamber A with explosive mixture and water—will continue so long as fuel is supplied to the carbureter F and the valve s is left open, and it may be discontinued by shutting off the supply of fuel from the carbureter and closing the valve s or by closing a valve (not shown) in the pipe K. Such operation is the continuous operation of the apparatus after it is started.

To start the apparatus, it is necessary to charge the chamber A with a sufficient quantity of explosive mixture. To this end I provide the construction at the right of Fig. 1, which comprises a cylinder 15 and a pipe 16, which connects the said cylinder and the chamber A and is provided with a cock 17, as shown. The said cylinder 15 is provided with a filling-tube 18, having a removable cap, and it contains a spring-backed piston-valve 19, which is designed to normally close communication between the interior of the cylinder and the pipe 16.

20 indicates a lamp arranged below the cylinder and adapted to heat the same.

In effecting the initial charging of the vacuum-chamber A the cock 17 is opened and the cylinder 15 is charged with a sufficient quantity of gasolene or other hydrocarbon fuel. The lamp 20 is then lighted, so as to cause the gasolene to expand and exert a pressure against the piston 19. When the gasolene or other fuel is sufficiently expanded, it will raise the piston 19 above the port connected with the pipe 16, and will consequently discharge through said pipe into the vacuum-chamber and will also enter the tube M. To ignite this initial charge of explosive mixture, it is necessary to raise the float 11 by hand and then permit it to fall, so as to make a contact between the spring 8 and conductive plate 9 and thus close the primary circuit of the induction-coil and form the spark between the rods 3 and 4 in the tube M. The initial explosion will then take place and the automatic operation before described will commence and continue until the supply of fuel and air is cut off.

Before the initial explosion is effected in the chamber A the cock 17 is closed and the lamp 20 is extinguished.

In order to prevent damage to the cylinder 15 in case the pipe 16 is clogged up or the cock 17 inadvertently closed, I provide said cylinder, above its connection with pipe 16, with the exhaust 25, through which gas will leave the cylinder if it cannot pass through the pipe 16.

It will be observed from the foregoing that when started my improved apparatus is entirely automatic in its action and therefore requires but little attention. It will also be observed that all of the working parts of the apparatus are arranged outside the chamber A, so that convenient access may be had to them for needed repairs.

Having thus described my invention, what I claim is—

1. In an apparatus for producing a vacuum or partial vacuum by explosions of gas, a closed vessel having an inlet and an outlet for water, an ignition-tube disposed vertically at the side of the vessel and communicating at its lower end with said vessel adjacent to the bottom thereof, a gas-supply pipe communicating with interior of the chamber, a pipe connected with the gas-supply pipe and also connected with the ignition-tube and provided with means for permitting the passage of gas to the ignition-tube and checking its return, and suitable means in said tube for igniting the explosive, substantially as specified.

2. In an apparatus for producing a vacuum or partial vacuum by explosions of gas, the combination of a closed vessel within which the explosions are produced, the said vessel having a valve-controlled suction-pipe and also having an outlet for liquid, an exhaust-pipe connected with the interior of the vessel and adapted to serve as a conduit to convey explosive to the vessel, a valve controlling the outer end of said pipe, a pipe I, connected with an explosive source of supply, a valve-casing connected with said pipe I, a pipe K, connecting said casing and the exhaust-pipe, a cut-off valve arranged in the casing and having a port for connecting the pipes I, K, and also having a stem adapted to be moved by the movement of the valve controlling the outlet of the exhaust-pipe, a cylinder arranged above the valve-cylinder and connected with the exhaust-pipe, and a piston in said cylinder connected with the cut-off valve, substantially as specified.

3. In an apparatus for producing a vacuum or partial vacuum by explosions of gas, the combination of a closed vessel having an inlet for water and an inlet for gas and also having a valve-controlled outlet for particles of combustion and a valve-controlled outlet for liquid, and a receptacle arranged without the vessel and containing the said outlets, the said receptacle having its walls extended above the outlets so as to enable it to retain a sufficient quantity of liquid to seal the outlets, substantially as specified.

4. In an apparatus for producing a vacuum or partial vacuum by explosions of gas, the combination of a closed vessel within which the explosions are produced, the said vessel having a valve-controlled suction-pipe and also having an outlet for liquid, an exhaust-pipe connected with the interior of the vessel, an ignition-tube connected at one end with the interior of the vessel, a valve controlling the outer end of the exhaust-pipe, a pipe I, connected with an explosive source of supply, a valve-casing connected with said pipe I, a pipe K, connecting said casing and the exhaust-pipe, a cut-off valve arranged in the casing and having a port for connecting the pipes I, K, and also having a stem adapted to be moved by the movement of the valve controlling the outlet of the exhaust-pipe, a cylinder arranged above the valve-cylinder and connected with the exhaust-pipe, a piston in said cylinder connected with the cut-off valve, and an igniting device arranged in the ignition-tube, substantially as specified.

5. In an apparatus for producing a vacuum or partial vacuum by explosions of gas, the combination of a closed vessel having a valve-controlled suction-pipe and a valve-controlled outlet for liquid, an exhaust-pipe connected with the interior of the vessel, an ignition-tube connected at one end with the interior of the vessel, a valve controlling the outer end of the exhaust-pipe, a pipe I, connected with air and gas sources of supply, a valve-casing connected with said pipe I, a pipe K, connecting said casing and the exhaust-pipe, a cut-off valve arranged in the casing and having a port for connecting the pipes I, K, and also having a stem adapted to be moved by the movement of the valve controlling the outlet of the exhaust-pipe, a cylinder arranged above the valve-cylinder and connected with the exhaust-pipe, a piston in said cylinder with the cut-off valve, an ignition device arranged in the ignition-tube, a movable device arranged so as to be moved by the discharge of liquid from the vessel, and connections between the movable device and the ignition device, substantially as specified.

6. In an apparatus for producing a vacuum or partial vacuum by explosions of gas, the combination of a closed vessel, a cylinder having a filling-tube and a removable cap closing the same, a pipe connecting said cylinder and the vessel, a spring-backed piston arranged in the cylinder and controlling communication between the cylinder and the pipe, and a heating device arranged below the cylinder, substantially as specified.

7. In an apparatus for producing a vacuum or partial vacuum by explosions of gas, the combination of a closed vessel, having an inlet for liquid and also having a discharge for particles of combustion, a source of explosive-supply, a valve-casing connected with the interior of the vessel and the source of supply, and a cut-off valve in said casing for controlling communication between the source of explosive-supply and the interior of the vessel, said valve being operative by the discharge of particles of combustion from the vessel, by the suction created in the vessel and by gravity, substantially as specified.

8. An apparatus for producing a vacuum or partial vacuum by explosions of gas, comprising a closed vessel and a discharge-pipe for particles of combustion communicating with the interior of the vessel, the said discharge-pipe being formed in two sections with the muffler E, formed by the conduits $i, j$, interposed between and connected to the contiguous ends of said sections, substantially as specified.

9. In an apparatus for producing a vacuum or partial vacuum by explosions of gas, the combination of a closed vessel within which the explosions are produced, the said vessel having a valve-controlled suction-pipe and also having an outlet for liquid, a source of explosive-supply, a discharge-pipe for particles of combustion communicating with the interior of the vessel, a conduit connecting the source of explosive-supply and said discharge-pipe, an automatic cut-off valve arranged in said conduit and operative by the discharge of particles of combustion from the vessel, by the suction created in the vessel and by gravity, and suitable means for igniting the explosive in the closed vessel, substantially as specified.

10. In an apparatus for the purpose described, a carbureter comprising a tank, pipes extending through the side walls of the tank and across the bottom of the same and having their ends open and also having apertures in their transverse portions, a hydrocarbon-supply pipe connected with the interior of the tank and having a valve, and a float arranged in the tank and connected with the valve, substantially as specified.

11. In an apparatus for producing a vacuum or partial vacuum by explosions, the combination of a closed vessel having an inlet for liquid and an inlet for explosive and also having a valve-controlled outlet, suitable means for igniting explosive in the vessel, and a liquid-receptacle containing the said valve-controlled outlet and being adapted to contain a sufficient quantity of liquid to form a liquid seal of the outlet, substantially as specified.

12. In an apparatus for producing a vacuum or partial vacuum by explosions, the combination of a closed vessel having an inlet for liquid and an inlet for explosive and also having a valve-controlled outlet for particles of combustion, suitable means for igniting explosive in the vessel, and a receptacle for liquid containing the said outlet; said receptacle being connected with the vessel so as to be supplied at each discharge of liquid therefrom and being adapted to retain a sufficient quantity of liquid to form a liquid seal of the outlet, substantially as specified.

13. In an apparatus for producing a vacuum or partial vacuum by explosions, the combination of a closed vessel having an inlet for liquid and an inlet for explosive and also having a valve-controlled outlet for liquid, suitable means for igniting explosive in the vessel, and a receptacle containing the said outlet for liquid; the said receptacle being adapted to retain a sufficient quantity of liquid to form a liquid seal for the outlet.

14. In an apparatus for producing a vacuum or partial vacuum by explosions, the combination of a closed vessel having an inlet for liquid and an inlet for explosive and also having a valve-controlled outlet for liquid and a valve-controlled outlet for particles of combustion, suitable means for igniting explosive in the vessel, and a receptacle containing both of the said outlets; said receptacle being adapted to be supplied with liquid at each discharge of the same from the vessel and being also adapted to retain sufficient liquid to seal both outlets, substantially as specified.

15. In an apparatus for producing a vacuum or partial vacuum by explosions of gas, the combination of a closed vessel having a valve-controlled suction-pipe and a valve-controlled outlet for liquid, and also having a discharge-outlet for particles of combustion, a source of explosive-supply and a valve, controlling communication between the source of explosive-supply and the vessel, and operative by the explosion in the vessel to close communication between the source of explosive-supply and the vessel and by gravity to establish communication between said source of explosive-supply and the vessel, substantially as specified.

In testimony whereof I affix my signature in presence of two witnesses.

FREDERICK JOHN FRANCIS BRUGUIERE.

Witnesses:
FRANK J. LEVIS,
PHILIP GENSLER, Jr.